350-445

XR 3,617,115

United States [11] 3,617,115

| [72] | Inventor | Lawrence S. Pratt |
| | | 56 W. 11th St., New York, N.Y. 10011 |
| [21] | Appl. No. | 33,441 |
| [22] | Filed | Apr. 30, 1970 |
| [45] | Patented | Nov. 2, 1971 |

[54] EYEGLASSES HAVING A CORRECTED RETROVISION CAPABILITY
1 Claim, 4 Drawing Figs.
[52] U.S. Cl. .................................................. 351/50, 350/202, 350/293, 350/298
[51] Int. Cl. .................................................. G02c 7/14, G02b 7/18
[50] Field of Search .................................................. 351/50; 350/298, 296, 202, 201, 293; 128/76.5 ied
UNITED STATES PATENTS
1,359,576  11/1920  Colman ........................ 351/50
1,916,110  6/1933   Julien ......................... 351/50

*Primary Examiner*—David Schonberg
*Assistant Examiner*—John W. Leonard
*Attorney*—Richard Whiting ABSTRACT: A new form of eyeglass construction is disclosed having a retrovision capability including a corrective effect. One of the eyeglass lenses is mirrored on at least part of its substantially flat forward surface so that light rays emanating from behind the wearer's head pass through the lens twice before reaching his eye. The lens may be designed to correct any defect in the vision of that eye to the greatest extent possible. Opaque material can be applied to portions of the lens to screen out extraneous images.

PATENTED NOV 2 1971  3,617,115

LAWRENCE S. PRATT
INVENTOR.

BY

ATTORNEY

EYEGLASSES HAVING A CORRECTED RETROVISION CAPABILITY

The present invention relates to eyeglasses having a retrovision capability including a corrective effect. It is particularly adapted for use by persons who have suffered detached retinae.

Even if a detached retina is successfully reattached through surgery, the eye involved (hereinafter called the "weak" eye) frequently becomes out of focus with the other eye (hereinafter called the "normal" eye). The resulting condition, called diplopia, is difficult if not impossible to remedy by additional operations. This condition, the one of "double vision," may of course arise from other causes.

The sufferer of this condition (hereinafter called the "diploptic") sees two images and in many practical situations may disregard the image seen by the weak eye. The diploptic finds that in many important activities he must induce his brain to disregard the weaker image, or close that eye so that only one image remains. Actual occlusion of the weak eye is indeed necessary, to avoid accidents, in such activities as pouring and going up or down stairs, and is almost involuntary in reading.

The nuisance of dealing with or worrying about this double vision can only be completely obviated by wearing a patch on the weak eye or, for those who wear spectacles, by rendering opaque, with paint on the lens or otherwise, the lens or space in front of that eye. These expedients render the weak eye useless for forward vision.

The present invention affords the diploptic meaningful use of the repaired eye for retrovision without interfering with the regular functioning of the normal eye. The invention envisions a pair of eyeglasses having one clear lens, which may be a conventional corrective lens, for the normal eye and a special retrovision lens construction for the repaired eye. This special construction, which is aptly identified as a "prescription mirror," comprises a lens of prescribed formula having a flat forward surface, away from the eye, which surface is coated with a mirror material disposed so that the reflective surface faces rearwardly. The rear surface of the lens is coated with a dark, opaque material over its entire area except for an outer lateral zone of about one-third, which is left uncoated so that the reflective surface is visible there to the eye. It will be understood that the uncoated zone is on the right side of the right eye or the left side of the left eye, whichever is affected. The lens, in conjunction with its flat mirror coating, is designed to provide retrovision for the diploptic which is sharp and free of curvilinear distortion. All forward vision through the special lens is obstructed. Retrovision is accomplished simply by shifting the eyes so that the weak eye looks toward the uncoated outer lateral zone constituting the prescription mirror. If the head is turned outward 30 degrees, retrovision of 180 degrees will be obtained.

In the Drawings

Figure 1:
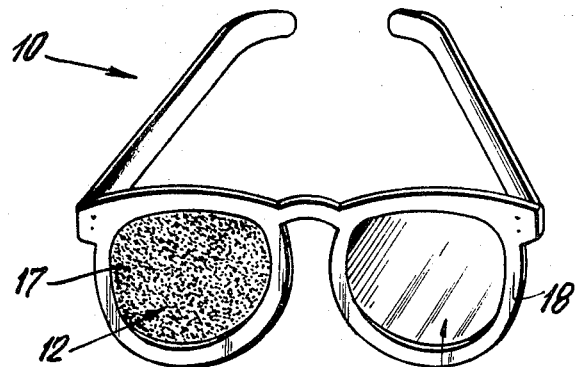
FIG. 1 is a front perspective view of eyeglasses embodying the present invention (for a diploptic whose weak eye is his right eye)
Figure 2:
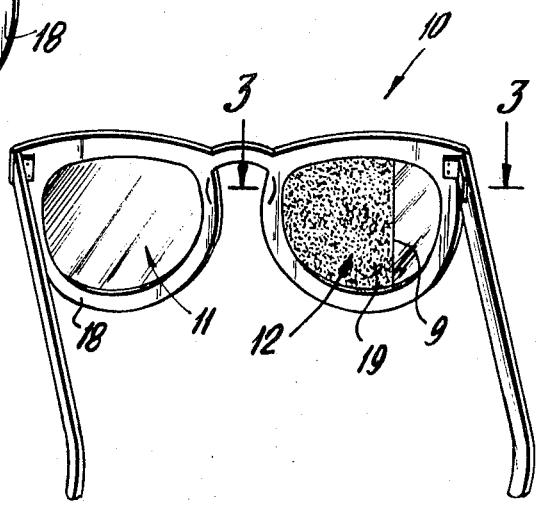
FIG. 2 is a rear perspective view of the eyeglasses shown in FIG. 1.
Figure 3:
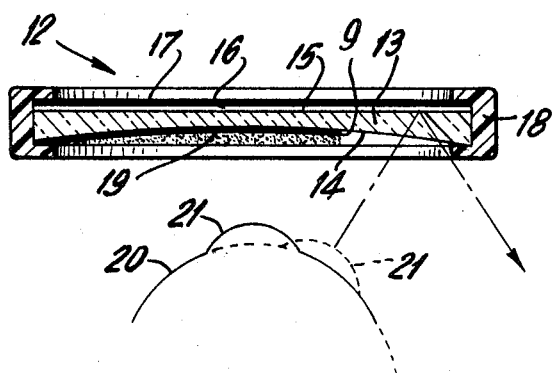
FIG. 3 is a top sectional view, taken along the line 3–3 in FIG. 2 showing two positions of the wearer's eye in relation to the mirror.

Referring to FIGS. 1 and 2, a pair of eyeglasses 10 is shown having two lens elements 11 and 12. Element 11 is a lens of conventional form for the normal eye. Element 12, a prescription mirror adapted for retrovision, appears dark to the world as shown in FIG. 1, and, as shown in FIG. 2, partially dark and partially reflective to the right eye of the wearer. The construction of element 12 is more fully detailed in FIG. 3. This lens is of concave construction for a nearsighted eye.

The prescription mirror 12 includes a lens 13 which has a curved rear or inner surface 14 nearest the eye and a forward surface 15. Forward surface 15 is coated with a thin layer 16 of mirror material, which may be mercury or other suitable substance with its reflective surface facing rearwardly. The forward surface 15 is flat in the sense that the mirror image it affords is devoid of undesired curvilinear distortion. This assembly is held in frame 18. To an eye 20 positioned behind curved surface 14 and directed at it, this construction affords a mirror.

Lens 13 is coated on its inner surface 14 with an opaque, nonreflective layer of material 19 covering the entire inner surface of the lens except for a vertical zone occupying about one-third of the lens area at its extreme outer lateral margin as indicated at 9 in FIG. 2. Thus, when the wearer is looking ahead with both eyes, eye 20 sees only blackness and the wearer's vision is not hampered by extraneous images. However, when the wearer desires retrovision, he simply directs right eye 20 to the marginal, unobstructed portion of prescription mirror 12. See the two positions of the cornea 21 shown in FIG. 3.

On the occasion of retrovision, light rays from the posterior scene being observed pass through lens 13 twice before reaching eye 20, once in passing toward the mirror and again upon reflection from the mirror toward eye 20. Lens 13 may therefore be designed, according to a special prescription or formula, to greatly sharpen the retrovision of eye 20. This formula may be determined by "trial and error," in the same manner as conventional prescription eyeglass lenses are formulated. Thus the lenslike element 12 is aptly described as a prescription mirror. Preferably, an opaque outer layer 17 is applied to the front of mirror layer 16. Any opaque material can be used. Black paint is suitable.

Figure 4:
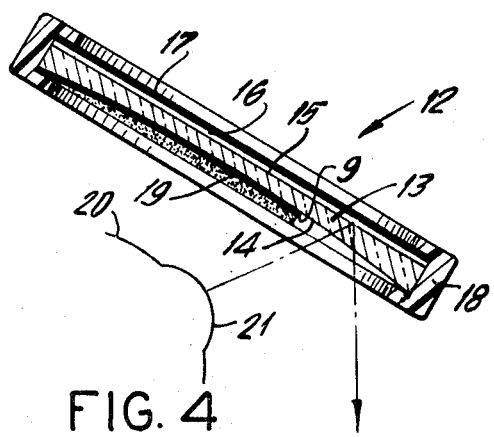
FIG. 4 is a top sectional view similar to FIG. 3 but with the head turned for retrovision of 180 degrees.

As shown in FIG. 4, by turning the head about 30 degrees to the right, the retrovision is 180 degrees to the rear.

I claim:

1. Eyeglasses providing forward vision for one eye of the wearer and corrected retrovision for the other eye of the wearer comprising, a frame holding a lens before one eye for forward vision and holding a mirror suitably ground to prescription before the other eye for retrovision, said mirror including a flat forwardly disposed surface having reflecting material deposited on at least the outer lateral portion thereof and a curved rear surface disposed toward the wearer's eye, said curved surface being suitably ground to prescription so that light rays emanating from behind the wearer pass into the mirror through the curved surface, are reflected at the flat forward surface, and pass out of the mirror through the curved surface and thence to the eye of the wearer, and opaque means interposed between the eye and a predetermined portion of the forwardly disposed surface so that extraneous reflections and all forward vision are blocked from the eye.

* * * * *